United States Patent
Bonhoure et al.

(10) Patent No.: US 9,815,408 B2
(45) Date of Patent: Nov. 14, 2017

(54) METHOD FOR OPERATING A REARVIEW CAMERA SYSTEM OF A MOTOR VEHICLE AFTER DETECTION OF A HEADLIGHT FLASHER, REARVIEW CAMERA SYSTEM AND MOTOR VEHICLE

(71) Applicant: VALEO Schalter und Sensoren GmbH, Bietigheim-Bissingen (DE)

(72) Inventors: Patrick Bonhoure, Annemasse (FR); Siav Kuong Kuoch, Saint Maur des Fosses (FR)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 15/101,716

(22) PCT Filed: Oct. 15, 2014

(86) PCT No.: PCT/EP2014/072155
§ 371 (c)(1),
(2) Date: Jun. 3, 2016

(87) PCT Pub. No.: WO2015/086201
PCT Pub. Date: Jun. 18, 2015

(65) Prior Publication Data
US 2016/0375827 A1   Dec. 29, 2016

(30) Foreign Application Priority Data

Dec. 12, 2013   (DE) .................. 10 2013 020 946

(51) Int. Cl.
*G08G 1/017* (2006.01)
*B60Q 9/00* (2006.01)
(Continued)

(52) U.S. Cl.
CPC ............... *B60Q 9/005* (2013.01); *B60R 1/00* (2013.01); *B60W 50/14* (2013.01);
(Continued)

(58) Field of Classification Search
CPC .. B60Q 1/1423; B60Q 1/143; B60Q 2300/41; B60Q 2300/43; B60Q 9/005; B60R 1/00; G06K 9/00825; B60W 50/14
(Continued)

(56) References Cited

U.S. PATENT DOCUMENTS

| 5,289,321 A | 2/1994 | Secor |
| 7,859,565 B2 | 12/2010 | Schofield et al. |

(Continued)

FOREIGN PATENT DOCUMENTS

EP   2 523 174 A1   11/2012

OTHER PUBLICATIONS

International Search Report issued in PCT/EP2014/072155 dated Jan. 5, 2015 (2 pages).
(Continued)

*Primary Examiner* — Thomas Mullen
(74) *Attorney, Agent, or Firm* — Osha Liang LLP

(57) ABSTRACT

The invention relates to a method for operating a rearview camera system (2) of a motor vehicle (1), in which a sequence of images (15) of an environmental region (9) behind the motor vehicle (1) is provided by means of an image capturing device (3) of the rearview camera system (2) and the sequence of the images (15) is displayed on a display (10), wherein a headlight flasher (14) of a vehicle (13) located in the environmental region (9) is detected by the rearview camera system (2) and due to the detection of the headlight flasher (14), a warning signal (17) separate
(Continued)

Figure 1:
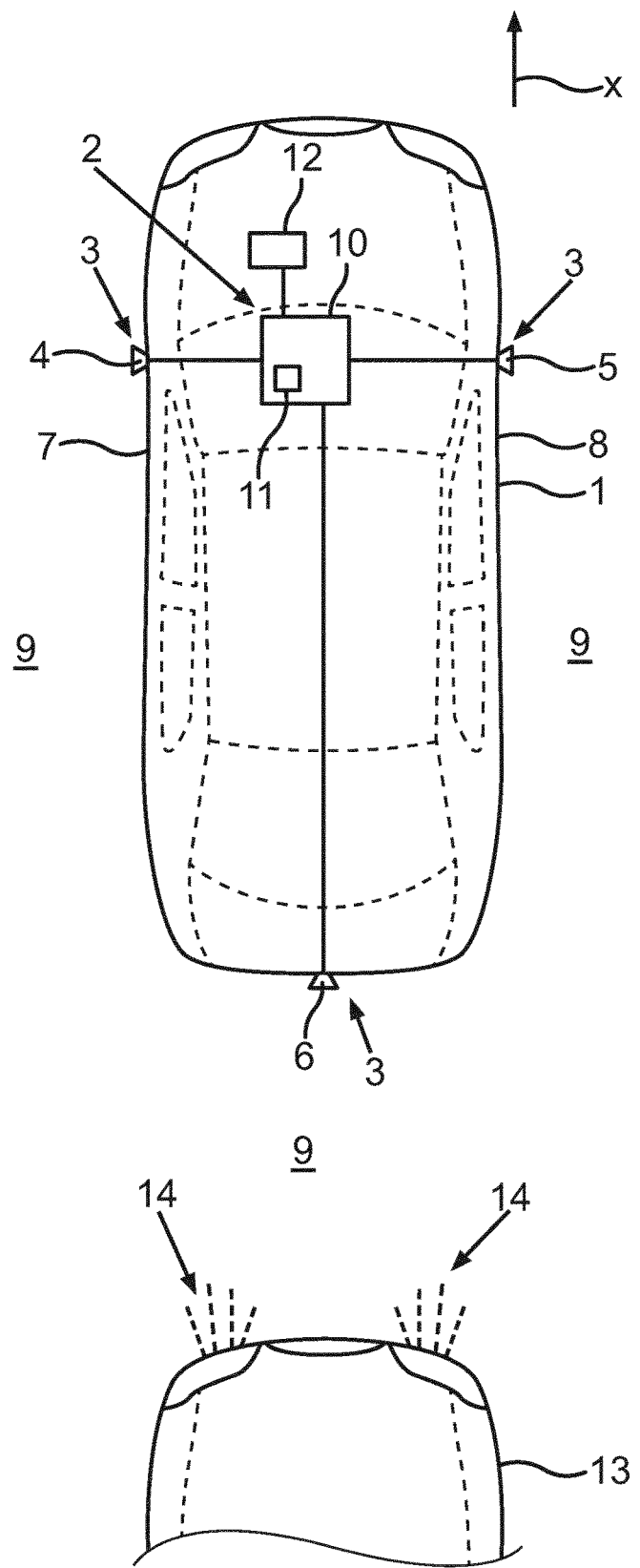

from the images (15) is generated, by which the detected headlight flasher (14) is signaled to the driver of the motor vehicle (1).

13 Claims, 2 Drawing Sheets

(51) Int. Cl.
*B60R 1/00* (2006.01)
*G06K 9/00* (2006.01)
*B60W 50/14* (2012.01)

(52) U.S. Cl.
CPC ...... *G06K 9/00825* (2013.01); *B60R 2300/80* (2013.01); *B60R 2300/8046* (2013.01)

(58) Field of Classification Search
USPC ......... 340/933, 937, 901, 905, 435; 348/148
See application file for complete search history.

(56) References Cited

U.S. PATENT DOCUMENTS

| | | | |
|---|---|---|---|
| 8,130,269 B2 | 3/2012 | Mori et al. | |
| 2007/0008093 A1* | 1/2007 | Nigro | B60Q 1/50 340/436 |
| 2012/0287276 A1* | 11/2012 | Dwivedi | G06K 9/00825 348/148 |
| 2013/0307984 A1 | 11/2013 | Pan | |

OTHER PUBLICATIONS

Written Opinion of the International Searching Authority issued in PCT/EP2014/072155 dated Jan. 5, 2015 (5 pages).

\* cited by examiner

METHOD FOR OPERATING A REARVIEW CAMERA SYSTEM OF A MOTOR VEHICLE AFTER DETECTION OF A HEADLIGHT FLASHER, REARVIEW CAMERA SYSTEM AND MOTOR VEHICLE

The invention relates to a method for operating a rearview camera system of a motor vehicle, in which a sequence of images of an environmental region behind the motor vehicle is provided by means of an image capturing device of the rearview camera system and the sequence of the images is displayed on a display. In addition, the invention relates to a rearview camera system for a motor vehicle as well as to a motor vehicle with a rearview camera system.

Camera systems for motor vehicles are already prior art. Presently, the interest is directed to a motor vehicle, in which a digital camera system is employed as an alternative to the exterior mirrors, the digital camera system representing a virtual mirror. Such vehicles doing without conventional exterior mirrors are already known from the prior art. Therein, instead of the exterior mirrors, a rearview camera system is employed, which includes an image capturing device with one or more cameras. The image capturing device has a capturing range corresponding to an environmental region of the motor vehicle behind the driver's seat of the motor vehicle and behind the motor vehicle. The image capturing device provides a video, in which the overall capturing range of the image capturing device is depicted. This video is displayed on a display.

Such rearview camera systems are already prior art. Thus, the document U.S. Pat. No. 5,289,321 A for example describes a camera system, in which the captured images are presented on a display device integrated in the rearview mirror in the interior of the vehicle. A display area is disposed on the left side of the rearview mirror, in which the vehicle environment to the left of and behind the vehicle is displayed. On the right side of the rearview mirror, in turn, a further display area is disposed, in which the environment to the right of the motor vehicle is displayed.

Furthermore, the document U.S. Pat. No. 7,859,565 B2 describes a rearview camera system, in which additional information is also superimposed on the display device.

From the document U.S. Pat. No. 8,130,269 B2 too, a camera system is known, in which additional information is superimposed on the presentation on the display device (a so-called overlay), which is generated depending on the current roadway type and by which a determined distance from the motor vehicle is represented.

If the rearview mirrors of a motor vehicle are replaced with a display, thus, new problems arise, which are based on the different character of the conventional rearview mirrors on the one hand and a digital display on the other hand. In comparison to conventional rearview mirrors, the display of a rearview camera system cannot reflect the light or only reflect it in limited manner. This difference is particularly conspicuous in particular in darkness—for example at night—and can result in problems.

It is an object of the invention to demonstrate a solution how in a method of the initially mentioned kind the driver can be more reliably assisted in driving the motor vehicle than in the prior art by the rearview camera system.

According to the invention, this object is solved by a method, by a rearview camera system as well as by a motor vehicle having the features according to the respective independent claims. Advantageous implementations of the invention are the subject matter of the dependent claims, of the description and of the figures.

A method according to the invention serves for operating a rearview camera system of a motor vehicle, wherein the motor vehicle preferably does not have conventional exterior mirrors and/or a conventional interior mirror, but the rear view camera system adopts the function of a virtual mirror. An image capturing device of the rearview camera system provides a sequence of images (video), in which an environmental region of the motor vehicle in vehicle longitudinal direction or in direction of travel behind the motor vehicle—in particular behind a driver's seat—is depicted. The sequence of the images is then displayed on a display in the interior of the motor vehicle. A headlight flasher of a vehicle located in the depicted environmental region and thus behind the motor vehicle is then detected by the rearview camera system. Due to the detection of the headlight flasher, a warning signal separate or different from the images is then generated by the rearview camera system. The detected headlight flasher is signaled to the driver by the warning signal.

The invention is based on the realization that a headlight flasher can be generated in some situations to make the driver of a preceding vehicle aware of certain problems. With conventional rearview mirrors, the driver of the preceding vehicle can recognize this headlight flasher without problem since the conventional rearview mirrors are able to very well reflect the light. If a rearview camera system with a display is now employed as a replacement for the conventional rearview mirrors, thus, it can possibly occur that the driver is not able to perceive the headlight flasher. Namely, a display cannot reflect the light or only reflect it in limited manner. Now it can occur that a succeeding vehicle generates a headlight flasher, which then is not perceived by the driver of the motor vehicle. If such a headlight flasher is generated by the succeeding vehicle, thus, the pixels of the images are saturated, and a white image is temporarily displayed on the display. It is not necessarily interpreted as a headlight flasher by the driver since the brightness of the display is usually limited. Now, the invention takes the way of detecting a headlight flasher of a vehicle located behind the motor vehicle and generating a warning signal after detection of the headlight flasher, by which the driver is made aware of the headlight flasher of the succeeding vehicle. Thus, the driver of the motor vehicle is particularly reliably assisted in driving the motor vehicle by the rearview camera system. Optionally, accidents can therefore also be prevented.

Presently, a short, strong light beam or light pulse is understood by a headlight flasher, which is generated by means of the high-beam headlights of the vehicle.

The image capturing device includes one or more cameras. For example, at least two cameras can be employed, such as for example a first camera on the left lateral flank of the motor vehicle as well as a second camera on the right lateral flank of the motor vehicle. Optionally, a camera can also be employed on a tail of the motor vehicle, for example on the rear bumper or else on the tailgate. The at least one camera is preferably a color-sensitive camera, which can detect light in the visible spectral range and thus provide photographic images. The at least one camera can be a CCD camera or a CMOS camera.

As already explained, in an embodiment, it can be provided that the motor vehicle is formed free of conventional exterior mirrors and/or free of an interior mirror such that the rearview camera system serves as a virtual mirror. Then, the environmental region behind the motor vehicle is displayed on the display, which always corresponds at least to the legal requirement with respect to the size of the displayed environmental region.

Preferably, the headlight flasher can be detected by the rear view camera system based on the images themselves. To this, the rearview camera system can for example include an image processing device, which for example can evaluate the brightness of the pixels and thus detect the headlight flasher. Thus, further sensors do not have to be employed.

In an embodiment, it is provided that saturated pixels of the images are detected and the detection of the headlight flasher is effected based on the saturated pixels. If a headlight flasher is generated in the field of view of the image capturing device, thus, the brightness values of the pixels of the image data increase and exceed a saturation threshold. If such a saturation of pixels of the image data is detected for a relatively short period of time, this can be interpreted as a headlight flasher by the rearview camera system, which has been generated by a succeeding vehicle. The information about the saturation of pixels is usually present in the mage sensor of the image capturing device and thus can also be read out of the image sensor. However, it is also possible to detect the saturation based on image data output by the image sensor. Based on saturated pixels, the headlight flasher overall can therefore be reliably detected without much effort.

It can also be provided that a saturation level of the saturated pixels is determined by the rearview camera system. Then, an intensity of the warning signal can be adjusted depending on the saturation level. Thus, the driver can also be made aware of the intensity of the headlight flasher—it depends on the temporal duration of the headlight flasher.

In an embodiment, it is provided that the warning signal is output by means of an output device separate from the display. Thus, the warning signal can be particularly effectively and intuitively perceived by the driver. In addition, adaptation of the display is therefore not required.

In this context, it is advantageous if an optical output device, in particular an illumination device, is used as the separate output device. Thus, the warning signal can be output by means of an optical output device separate from the display, preferably by means of an illumination device. Such an illumination device can for example include at least one light emitting diode, which is controlled to flash after detection of the headlight flasher. Then, the generated light represents the warning signal, which can be particularly well perceived by the driver.

Additionally or alternatively, it can be provided that the warning signal is output by means of the display itself. Thus, a component already present anyway can also be used to output the warning signal, by which the driver is made aware of the headlight flasher.

In this respect, the warning signal can be output in that at least a partial region of the display is backlit by means of a background illumination device of the display. At least a partial region of the display is therefore optically highlighted with respect to the remaining display area by activating or increasing a corresponding background illumination. This embodiment exploits the fact that the today's displays—as in particular LED displays—usually have a background illumination device, by means of which the brightness of the display can be increased. This background illumination device can now be utilized to signal the detected headlight flasher to the driver. This embodiment has the advantage that using a background illumination device, the position of the warning signal can also be correspondingly adjusted on the display.

In an embodiment, it is provided that a position of the headlight flasher in the images is determined by the rearview camera system. This position can in particular be determined based on a position of the saturated pixels in the image frame. If this position of the headlight flasher is known with the images, thus, the above mentioned partial region of the display can be determined depending on the position of the headlight flasher. For example, that partial region of the display can be backlit, in which the headlights of the succeeding vehicle are depicted in order to thus overall achieve a realistic reproduction of the headlight flasher.

The invention also relates to a rearview camera system for a motor vehicle, wherein the rearview camera system is formed for performing a method according to the invention.

A motor vehicle according to the invention, in particular a passenger car, includes a rearview camera system according to the invention.

The preferred embodiments presented with respect to the method according to the invention and the advantages thereof correspondingly apply to the rearview camera system according to the invention as well as to the motor vehicle according to the invention.

Further features of the invention are apparent from the claims, the figures and the description of figures. All of the features and feature combinations mentioned above in the description as well as the features and feature combinations mentioned below in the description of figures and/or shown in the figures alone are usable not only in the respectively specified combination, but also in other combinations or else alone.

Now, the invention is explained in more detail based on a preferred embodiment as well as with reference to the attached drawings.

Figure 2:
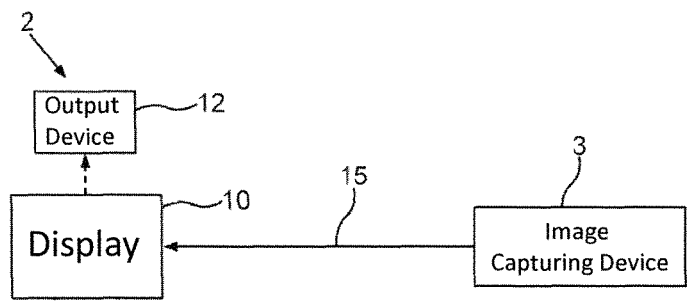

There show:

FIG. 1 in schematic illustration a motor vehicle with a rearview camera system according to an embodiment of the invention;

FIG. 2 a block diagram of the rearview camera system; and

Figure 3:
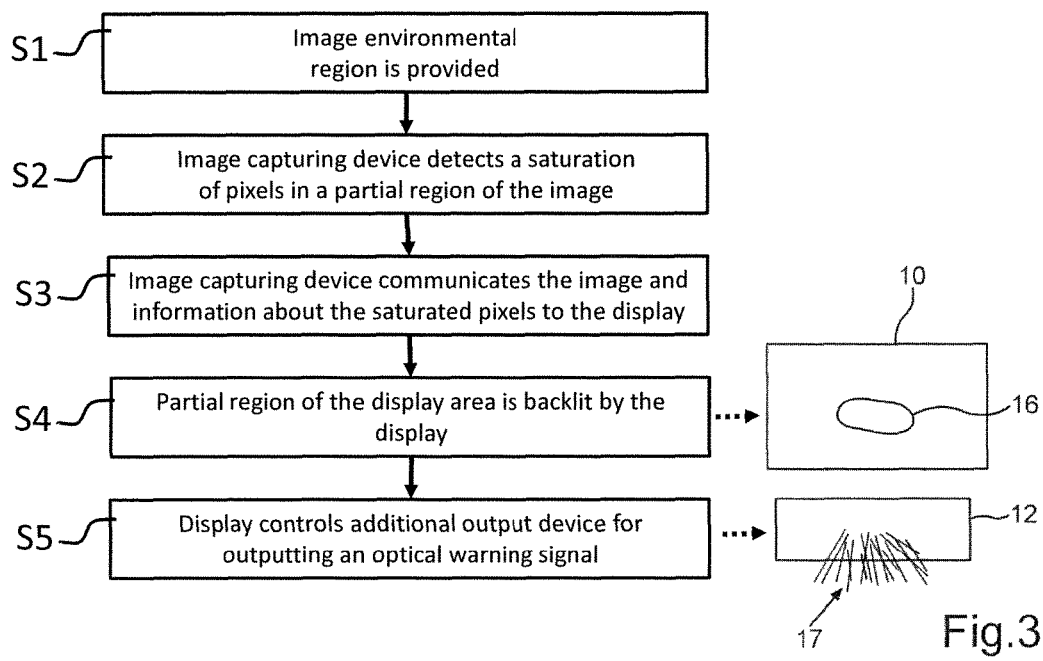

FIG. 3 a flow diagram of a method according to an embodiment of the invention.

A motor vehicle 1 illustrated in FIG. 1 is a passenger car in the embodiment. The motor vehicle 1 includes a rearview camera system 2, which is installed in the motor vehicle 1 instead of the conventional rearview mirrors. The rearview camera system 2 includes an image capturing device 3 including at least a first camera 4 as well as a second camera 5 in the embodiment. The first camera 4 is disposed on a left lateral flank 7; the second camera 5 is disposed on a right lateral flank 8. Optionally, the image capturing device 3 can also have a third camera 6, which is for example disposed on the rear bumper or else on the tailgate. The cameras 4, 5 can for example be disposed in the same position, in which otherwise the conventional exterior mirrors are disposed. Thus, the cameras 4, 5 can be disposed in front of a driver's seat in longitudinal direction x of the motor vehicle 1. Moreover, the cameras 4, 5 can be oriented slightly rearwards in longitudinal direction x. The cameras 4, 5, 6 are video cameras, for example CCD cameras or CMOS cameras.

The image capturing device 3 has an overall capturing range representing a sum of the respective capturing ranges of the cameras 4, 5, 6. The image capturing device 3 therefore captures an environmental region 9 of the motor vehicle 1 behind the driver's seat and provides a sequence of images, in which the environmental region 9 is depicted.

The provided images are communicated to a display 10, which is coupled to the cameras 4, 5, 6. Optionally, an image processing device 11 can also be integrated in the display 10. The display 10 can be a LED display.

Optionally, the rearview camera system 2 can have an additional optical output device 12, which is formed as an illumination device with at least one light emitting diode in the embodiment. The output device 12 can be controlled by a microcontroller of the display 10.

The rearview camera system 2 serves as a replacement for conventional rearview mirrors. The provided images of the environmental region 9 behind the motor vehicle 1 are displayed on the display 10. Now, it can occur that a succeeding vehicle 13 generates a headlight flasher 14, that is a short light pulse. This headlight flasher 14 results in a temporary increase of the brightness values of the pixels and thus in saturation of the pixels. A white presentation appears on the display 10 for a short time, which is not necessarily interpreted as a headlight flasher 14 by the driver of the motor vehicle 1.

In order to make the driver of the motor vehicle 1 aware of the headlight flasher 14 of the vehicle 13, this headlight flasher 14 can be detected by the rearview camera system 2. Then, the rearview camera system 2 can output a warning signal, by which the driver of the motor vehicle 1 is made aware of the headlight flasher 14. This warning signal can be generated by means of the display 10 and/or by means of the separate output device 12.

A block diagram of the rearview camera system 2 is shown in FIG. 2. The image capturing device 3 provides images 15 (image data) and communicates these images to the display 10. Optionally, the display 10 can control the additional output device 12.

A method according to an embodiment of the invention is explained in more detail below with reference to FIG. 3. By means of the image capturing device 3, in a first step S1, an image 15 of the environmental region 9 is provided. The image capturing device 3 detects a saturation of pixels in a partial region of the image 15 in a further step S2. Since the pixels are saturated, the image capturing device 3 thus detects a headlight flasher 14. Since the position of the saturated pixels in the image 15 is known, the position of the headlight flasher 14 in the image 15 is also known. Here, the saturation level of the saturated pixels can optionally also be determined. According to step S3, the image capturing device 3 communicates the image 15 as well as information about the saturated pixels to the display 10. Therein, information about which pixels are saturated is communicated. For example, this information can be communicated in the form of a list of the saturated pixels and/or in the form of a separate image, in which exclusively the saturated pixels are identified. Optionally, the saturation level is also communicated to the display 10.

In a further step S4, a partial region 16 of the display area is backlit by the display 10. To this, a background illumination device of the display 10 is used. Therein, this partial region 16 corresponds to that partial region of the image 15, the pixels of which are saturated.

Optionally, the intensity of the illumination of the partial region 16 is adjusted depending on the saturation level. This backlighting of the partial region 16 represents the above mentioned warning signal.

Additionally or alternatively, the display 10 can control the additional output device 12 for outputting an optical warning signal 17, which signals the headlight flasher 14, according to a step S5. Therein, the above mentioned light emitting diode can for example flash for a short time. Here too, the intensity of the warning signal 17 can optionally be adjusted depending on the saturation level of the pixels.

The invention claimed is:

1. A method for operating a rearview camera system of a motor vehicle, comprising:
   providing, by an image capturing device of the rearview camera system, a sequence of images of an environmental region behind the motor vehicle;
   displaying the sequence of the images on a display;
   detecting, by the rearview camera system, a headlight flasher of a vehicle located in the environmental region; and
   based on the detection of the headlight flasher, generating a warning signal by which the detected headlight flasher is signaled to the driver of the motor vehicle.

2. The method according to claim 1, wherein the motor vehicle is formed free of exterior mirrors and/or free of an interior mirror and the rear view camera system is formed as a virtual mirror.

3. The method according to claim 1, wherein the headlight flasher is detected by the rearview camera system based on the images.

4. The method according to claim 1, wherein saturated pixels of the images are detected by the rearview camera system, and the detection of the headlight flasher is effected based on the saturated pixels.

5. The method according to claim 4, further comprising:
   deteiinining a saturation level of the saturated pixels; and
   adjusting an intensity of the warning signal depending on the determined saturation level.

6. The method according to claim 1, wherein the warning signal is output by means of an output device separate from the display.

7. The method according to claim 6, wherein the output device is an illumination device.

8. The method according to claim 1, wherein the warning signal is output by the display.

9. The method according to claim 8, wherein the warning signal is output in at least a partial region of the display that is backlit by a background illumination device of the display.

10. The method according to claim 1, wherein one or more positions of a headlight flasher is determined in one or more of the images based on one or more positions of the saturated pixels, by the rearview camera system.

11. The method according to claim 10, wherein the partial region of the display is determined depending on the one or more positions of the headlight flasher in the images.

12. A rearview camera system for a motor vehicle, wherein the rearview camera system is adapted to perform a method as claimed in claim 1.

13. A motor vehicle with a rearview camera system according to claim 12.

* * * * *